United States Patent
Makar et al.

(10) Patent No.: US 11,321,905 B2
(45) Date of Patent: May 3, 2022

(54) ERROR CONCEALMENT IN SPLIT RENDERING

(71) Applicant: QUALCOMM Incorporated, San Diego, CA (US)

(72) Inventors: Mina Ayman Saleh Yanni Makar, San Diego, CA (US); Soumyajit Bijankumar Deb, Bangalore (IN); Bojan Vrcelj, San Diego, CA (US); Arjun Sitaram, Bengaluru (IN); Dieter Schmalstieg, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/037,566

(22) Filed: Sep. 29, 2020

(65) Prior Publication Data

US 2021/0312691 A1   Oct. 7, 2021

Related U.S. Application Data

(60) Provisional application No. 63/005,137, filed on Apr. 3, 2020.

(51) Int. Cl.
*G06T 15/00* (2011.01)
*G06T 9/00* (2006.01)

(52) U.S. Cl.
CPC .............. *G06T 15/005* (2013.01); *G06T 9/00* (2013.01)

(58) Field of Classification Search
CPC ................................. G06T 15/005; G06T 9/00
See application file for complete search history.

(56) References Cited

U.S. PATENT DOCUMENTS

| | | | |
|---|---|---|---|
| 7,336,820 B2 | 2/2008 | Ji | |
| 9,576,393 B1 * | 2/2017 | Bethel | .............. G06T 19/00 |
| 2019/0066370 A1 | 2/2019 | Schmalstieg et al. | |
| 2019/0340812 A1 | 11/2019 | Fuetterling et al. | |
| 2020/0252682 A1 * | 8/2020 | Walker | .............. H04N 21/6583 |
| 2020/0258264 A1 * | 8/2020 | Martin | .............. H04N 19/96 |
| 2021/0176522 A1 * | 6/2021 | Walker | .............. H04N 21/64784 |

OTHER PUBLICATIONS

Mueller et al.; "Shading Atlas Streaming"; Nov. 2018; ACM Transactions on Graphics; vol. 37, No. 6, Article 199 (Year: 2018).*
Hladky J., et al., "Tessellated Shading Streaming", Eurographics Symposium on Rendering 2019, vol. 38, No. 4, 2019, 12 pages.
Mueller J.H., et al., "Shading Atlas Streaming", ACM Transactions on Graphics, Nov. 2018, vol. 37, No. 6, pp. 199:1-199:16.

* cited by examiner

*Primary Examiner* — David T Welch
(74) *Attorney, Agent, or Firm* — Campbell C. Chiang; Arent Fox LLP

(57) ABSTRACT

Graphics processing in a client device includes receiving, as part of a vector streaming split rendering process, a bit stream encoding a sequence of shading atlases of the process. Each shading atlas includes blocks. The client decodes a particular shading atlas of the sequence of shading atlases, and determines that a particular block of the particular shading atlas was unsuccessfully decoded. The client identifies a stored block of a prior shading atlas of the sequence of shading atlases as a successfully decoded earlier version of the particular block. The client renders the particular shading atlas using the stored block instead of the particular block.

30 Claims, 8 Drawing Sheets

ERROR CONCEALMENT IN SPLIT RENDERING

CROSS-REFERENCE TO RELATED APPLICATIONS

This application claims the benefit of U.S. Provisional Patent Application No. 63/005,137, entitled "Method and Apparatus for Error Concealment in Split Rendering," filed Apr. 3, 2020, which is expressly incorporated by reference herein in its entirety.

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects and is intended to neither identify key elements of all aspects nor delineate the scope of any or all aspects. Its sole purpose is to present some concepts of one or more aspects in a simplified form as a prelude to the more detailed description that is presented later.

In aspect of the technology disclosed herein, methods, computer-readable media, and an apparatuses are provided. In some examples, methods of graphics processing in a client device include receiving, as part of a vector streaming split rendering process, a bit stream encoding a sequence of shading atlases of the process. Each shading atlas includes blocks. The client decodes a particular shading atlas of the sequence of shading atlases, and determines that a particular block of the particular shading atlas was unsuccessfully decoded. The client identifies a stored block of a prior shading atlas of the sequence of shading atlases as a successfully decoded earlier version of the particular block. The client then renders the particular shading atlas using the stored block instead of the particular block.

In some examples, the client, prior to decoding the particular shading atlas, decodes the prior shading atlas. The client determines that a plurality of blocks, including an earlier version of the particular block in the prior shading atlas, were successfully decoded. The client stores each of the plurality of blocks, including the earlier version of the particular block, determined to have been successfully decoded. In some such examples, storing includes storing the prior shading atlas, and maintaining a block-to-shading-atlas location mapping specifying each atlas that contains the particular block; and identifying includes identifying the stored block in a most recently stored shading atlas that contains the particular block. In other such examples, storing includes storing the identified block apart from the prior shading atlas, and maintaining a block storage table specifying a block identifier of the identified block; and identifying includes identifying the stored block by a block identifier of the particular block matching the block identifier of the stored block in the block storage table. In some such examples, storing includes storing a most recent version of the identified block as corresponding to the block identifier.

In some examples, the client decodes a subsequent shading atlas of the bit stream using the stored block as part of previous state information. In some examples, the client receives, as part of the bit stream, size and aspect ratio information for the particular block determined to be unsuccessfully decoded. In such examples, the rendering first includes reshaping the stored block based on the received size and aspect ratio information. In some examples, the vector streaming split rendering process is received by the client device for an extended reality (XR) application, an augmented reality (AR) application, or a virtual reality (VR) application. In some examples, the bit stream is received by a headset, a client multimedia console, or a head mounted display (HMD).

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
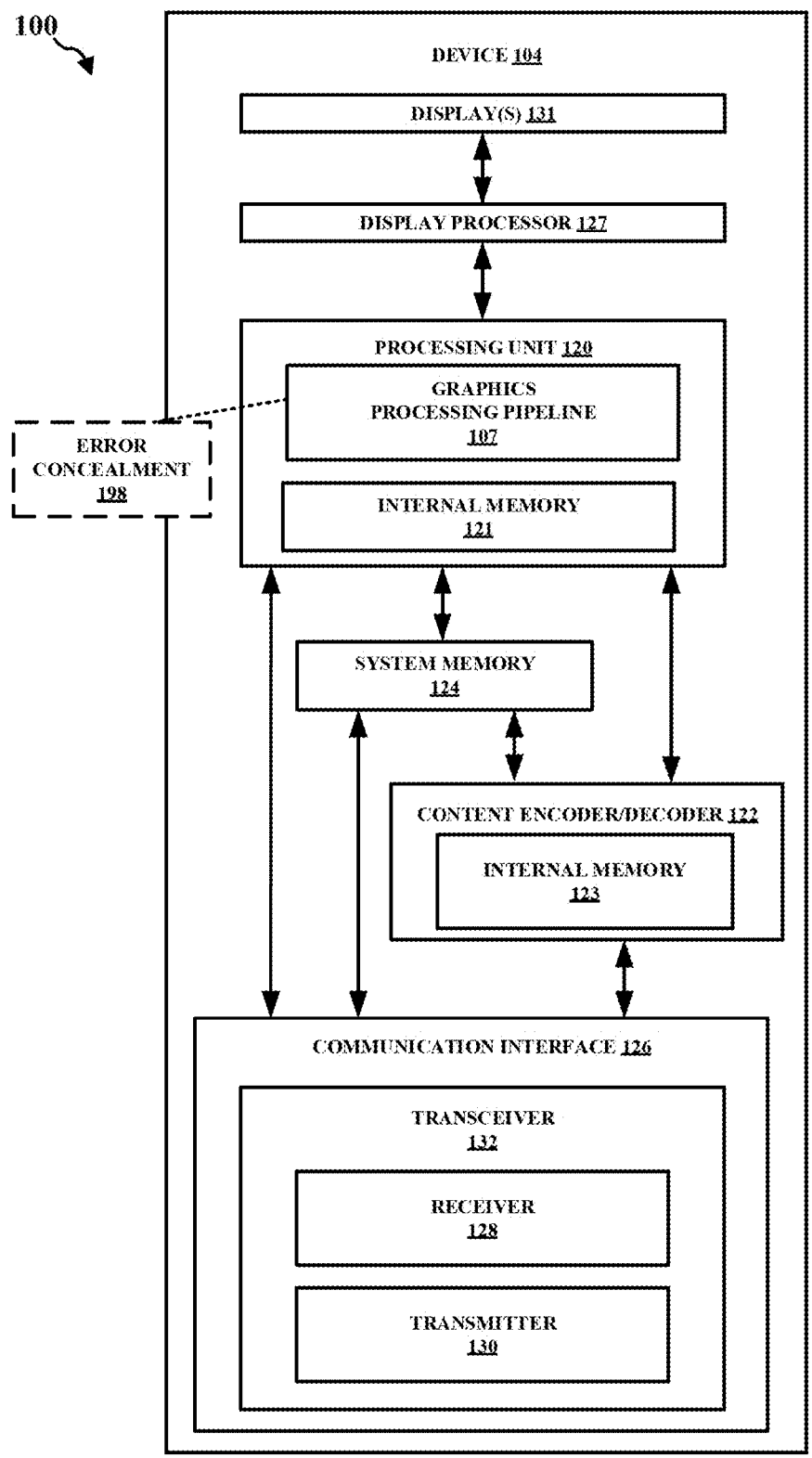
FIG. 1 is a block diagram that illustrates an example content generation system in accordance with one or more techniques of this disclosure.

Vector streaming systems can utilize a shading atlas, comprising blocks, which can be transported between a server and a client device. Also, some blocks in shading atlases may be dropped or not accurately received during transport. Some aspects of video transport systems can offer a level of resilience to network behavior, such as packet loss and/or increased delays over the network. In addition, the video streamed in vector streaming transport systems can have different properties compared to other systems. Aspects of the present disclosure can include an error concealment algorithm for vector streaming systems. For instance, vector streaming systems herein can stream information regarding how blocks from one shading atlas correspond to blocks from another shading atlas. For example, a block identifier. As such, the present disclosure can determine on the block-level whether corresponding pixel content was received in a previous information transport, and if so, when the previous information transport occurred. Accordingly, missing blocks from current shading atlases can be replaced using a previous successfully received version of the missing block, in some examples, from a previous shading atlas. Throughout this application, the word "block" is used to describe the smallest unit of information manipulated independently at the shading atlas organization stage. Elsewhere in the art of the technology disclosed herein, the word "patch" also is used.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented, or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "products of 3D graphics design," their rendition, i.e., "images," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example system 100 configured to implement one or more techniques of this disclosure. The system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 includes a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131.

For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104 or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include an error concealment component 198 configured to receive, as part of a vector streaming split rendering process, a bit stream encoding a sequence of shading atlases of the process. Each shading atlas includes blocks. The client decodes a particular shading atlas of the sequence of shading atlases, and determines that a particular block of the particular shading atlas was unsuccessfully decoded. The client identifies a stored block of a prior shading atlas of the sequence of shading atlases as a successfully decoded earlier version of the particular block. The client then renders the particular shading atlas using the stored block instead of the particular block. In some examples, the client, prior to decoding the particular shading atlas, decodes the prior shading atlas. The client determines that a plurality of blocks, including an earlier version of the particular block in the prior shading atlas, were successfully decoded. The client stores each of the plurality of blocks, including the earlier version of the particular block, determined to have been successfully decoded.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. Moreover, in the binning pass, different primitives can be shaded in certain bins, e.g., using draw calls. In some aspects, during the binning pass, a visibility stream can be constructed where visible primitives or draw calls can be identified.

In some aspects of rendering, there can be multiple processing phases or passes. For instance, the rendering can be performed in two passes, e.g., a visibility pass and a rendering pass. During a visibility pass, a GPU can input a rendering workload, record the positions of primitives or triangles, and then determine which primitives or triangles fall into which portion of a frame. In some aspects of a visibility pass, GPUs can also identify or mark the visibility of each primitive or triangle in a visibility stream. During a rendering pass, a GPU can input the visibility stream and process one portion of a frame at a time. In some aspects, the visibility stream can be analyzed to determine which primitives are visible or not visible. As such, the primitives that are visible may be processed. By doing so, GPUs can reduce the unnecessary workload of processing or rendering primitives that are not visible.

In some aspects, rendering can be performed in multiple locations and/or on multiple devices, e.g., in order to divide the rendering workload between different devices. For example, the rendering can be split between a server and a client device, which can be referred to as "split rendering." In some instances, split rendering can be a method for bringing content to user devices or head mounted displays (HMDs), where a portion of the graphics processing can be performed outside of the device or HMD, e.g., at a server.

Split rendering can be performed for a number of different types of applications, e.g., virtual reality (VR) applications, augmented reality (AR) applications, and/or extended reality (XR) applications. In VR applications, the content displayed at the user device can correspond to man-made or animated content, e.g., content rendered at a server or user device. In AR or XR content, a portion of the content displayed at the user device can correspond to real-world content, e.g., objects in the real world, and a portion of the content can be man-made or animated content. Also, the man-made or animated content and real-world content can be displayed in an optical see-through or a video see-through device, such that the user can view real-world objects and man-made or animated content simultaneously. In some aspects, man-made or animated content can be referred to as virtual content, or vice versa.

Some aspects of the present disclosure can consider different types of modalities of split XR or AR architecture, e.g., pixel streaming (PS) architecture and vector streaming (VS) architecture. In PS systems, content latency may be compensated using a variant of asynchronous time-warping (ATW) on the client prior to the display. For example, time-warping may distort the shape of the original rendered content or computer generated imagery (CGI). In some aspects, in an AR system, the PS frames that are streamed to the client may be time-warped based on a view transformation. For example, aspects of the present disclosure can perform a time projection such that the location of future frames can be determined based on the estimated future camera position.

In pixel streaming architecture, the server or game engine can determine the pixel information or eye buffer information for a frame and send the pixel information to the client device. The client device can then render the frame based on the pixel information. In some instances, this pixel information or eye buffer information can correspond to a particular pose in the frame.

As indicated herein, vector streaming is a type of split rendering system designed to offer improved latency tolerance and/or bandwidth usage for XR, AR, or VR traffic compared to traditional approaches, such as pixel streaming. As mentioned above, in pixel streaming, the server can render one or more frames, e.g., via eye buffers that represent videos that are represented through each eye. In some instances of pixel streaming, there can be a latency amount between the frame rendering time e.g., on the server, and the frame display time, e.g., on the client. This latency can be compensated by ATW, which results in an approximation of what image should be displayed had the delay been nonexistent, i.e., ideal display content. The longer the delay, the more the approximation may diverge from the imaginary ideal display content. At some point (and for some display values) this divergence becomes apparent.

In vector streaming systems, the server can stream the appearance of the virtual or CGI surfaces, as well as the geometry/meshes of these virtual objects. In the latter stages of device processing, e.g., prior to transferring information to the display, the client can rasterize the geometry of the visible virtual objects, using the most recent head pose, and/or texture-map the corresponding textures. This variant of latency compensation may not distort the shape of the objects and the boundaries between the foreground and background content, and thus, remain a more accurate depiction of the visible scene.

Vector streaming systems can also stream different types of information. For instance, in vector streaming architecture, a server can produce shading atlas information, e.g., a representation of the textures in the object space of potentially visible surfaces in the scene, as seen from a particular viewpoint. It can also stream meta-information, e.g., a mapping between the individual portions of the shading atlas to the corresponding subsets of the virtual object meshes, e.g., triangles, or polygons. The client device can receive the updated shading atlas information, the newly visible geometry/mesh information, and the corresponding meta-information in every frame sent by the server. The client can then rasterize the currently visible meshes using the latest device pose and it can utilize the shading atlas information and/or the meta-information to texture-map the shaded surfaces from atlas space to the final screen space, thus converting this information into pixels that can be displayed on the device. The frequency of the server frames may not correspond to the frequency of the frames displayed on the client.

In particular, server frame frequency can be lower: in some instances, it can correspond to ½, ⅓₆, ¼, or ⅕ of the targeted device-display frequency that may translate to bandwidth savings compared to pixel streaming.

In addition to sending the object meshes for faithful representation of shapes beyond what is visible from any one viewpoint, vector streaming system also transports the corresponding shaded surfaces, thus enabling the client to reconstruct accurately the virtual scene from all nearby viewpoints. Since the transported shaded surfaces are typically not all visible from any one viewpoint, they cannot be jointly represented in screen space, but are jointly stored in a shading atlas.

Figure 2A:
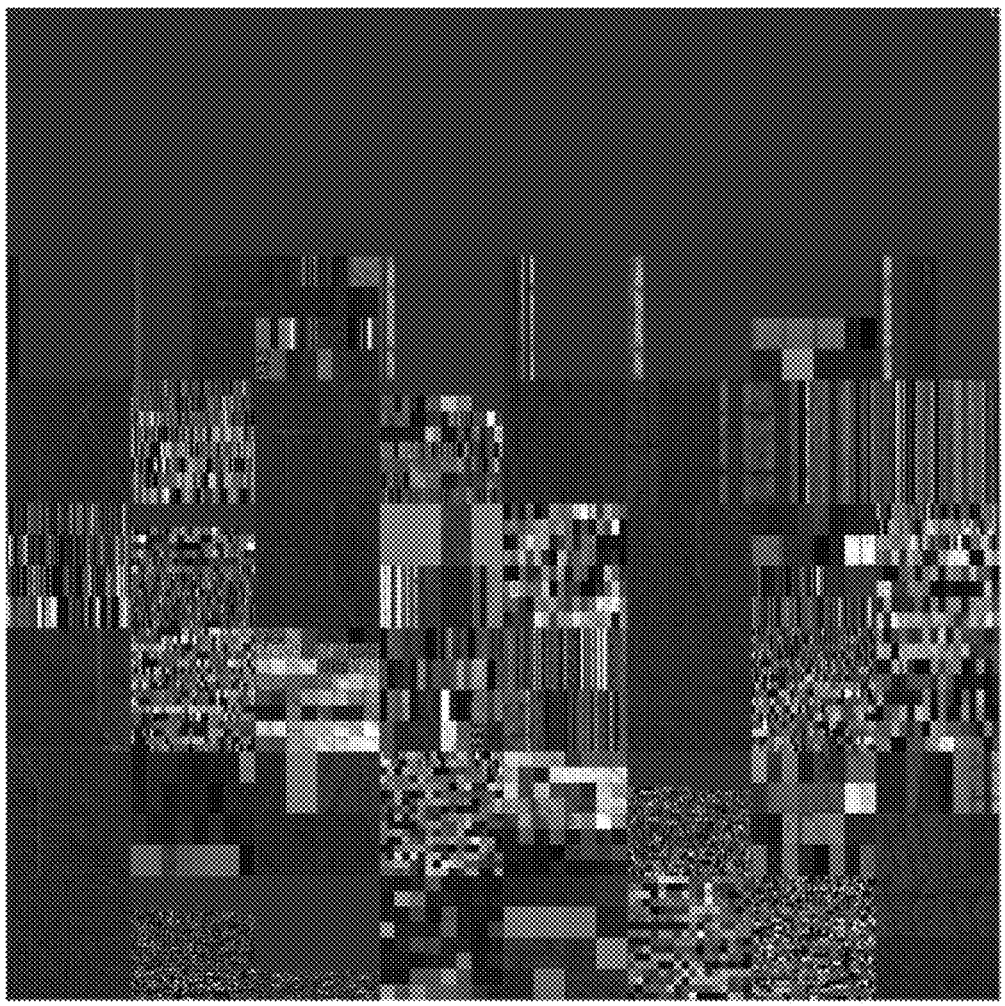
FIG. 2A illustrates an example shading atlas in accordance with one or more techniques of this disclosure.

FIG. 2A illustrates shading atlas 200 in accordance with one or more techniques of this disclosure. As shown in FIG. 2A, shading atlas 200 illustrates an efficient way of storing textures that are rendered in object space, rather than in image space. FIG. 2A also shows that different portions of shading atlas 200 are shaded at different resolutions, e.g., depending on a distance from a camera. Also, the dark gray portions of shading atlas 200 (e.g., the shade of gray on the far right side of FIG. 2A) can represent unallocated portions of the shading atlas 200. In some instances, shading atlas 200 can be efficiently encoded due to a high temporal coherence. For example, one block in shading atlas 200 can represent the same physical surface in a virtual world over a period of time. In some aspects, the blocks in the shading atlas 200 can remain in the same place for as long as they are potentially visible and occupying a similar area in a screen space. Such blocks would maintain a similar appearance with gradual and typically slight changes in shading. These properties result in high temporal correlation of the shading atlas as a whole.

Figure 2B:
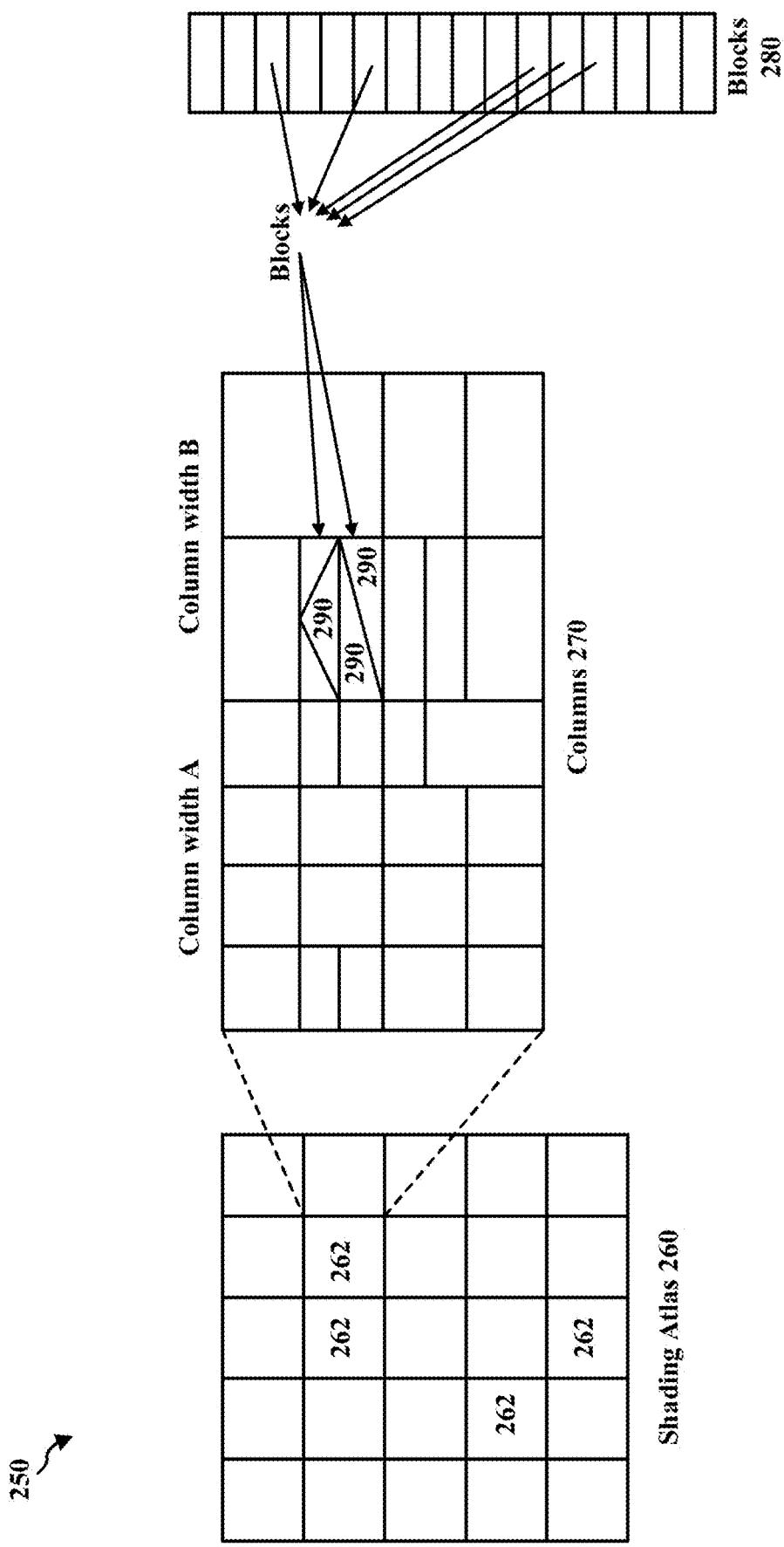
FIG. 2B illustrates an example shading atlas organization in accordance with one or more techniques of this disclosure.

FIG. 2B illustrates shading atlas organization 250 in accordance with one or more techniques of this disclosure. As shown in FIG. 2B, shading atlas 260 includes superblocks 262, with each superblock including columns 270. Columns of a certain width are all allocated in a same superblock. Thus, this structure including columns of width A and width B may be split between two superblocks. Each column further includes blocks 280, which are the basic elements of the shading atlas organization. In some aspects, column widths can be restricted to be a power of two (in pixel count). Thus, for example, column width A can be half the value of column width B. As shown in FIG. 2B, the organization of the shading atlas from large to small values can be superblocks 262 to columns 270 to blocks 280 to triangles 290. FIG. 2B illustrates how blocks 280 are packed efficiently into shading atlas 260. Moreover, this hierarchy of memory management allows for extensive parallelism when deciding how to organize blocks 280 in a shading atlas 260. The memory organization of the shading atlas may be as follows. The atlas includes superblocks which are further divided into columns (of equal width), and each column includes stacked blocks. Blocks are of rectangular shape (square being a special case), and they can include a certain fixed number of triangles. This is shown in the portion of FIG. 2B depicting the columns of width B where a few blocks are shown to include a number of triangles, e.g., triangles 290. For example, a block 280 can consist of one, two, or three triangles 290. In some implementations, block constellations including more than three triangles may also be possible. The triangle-to-block assignment is chosen once during asset loading and scene preprocessing (e.g., performed offline) and beyond that point, it remains fixed for the duration of the split rendering service. In some aspects, the triangle-to-block mapping operation is separate from the online memory organization of blocks into shading atlas, as depicted in FIG. 2B. In one instance, the triangles assigned to one block may be chosen such that they are neighbors in the object mesh, their aspect ratios may be "compatible" to the chosen block constellation, their sizes/areas may be in similar proportion as that of the canonical triangles arranged within a block, and their surface normals may be similar. The triangle-to-block assignment may be based purely on mesh properties, thus in the object space and as such may be done before the service starts. As opposed to that, the assignment of blocks to superblocks may change over time, such assignment is tightly coupled with the object appearance in screen space, and as such, it depends on the camera position and orientation. There are several factors dictating whether a block will appear in the atlas, and if so what its dimensions should be. Firstly, a block is initiated into a shading atlas once it becomes a part of the potentially visible set. This roughly means that the block is added for the first time once it can be revealed by camera moving near the present location. The initial superblock assignment for the added block depends on the block appearance in screen space. The blocks, which are closer to the camera, appear bigger in screen space and thus are allocated a larger portion of the atlas real estate. In addition, blocks that appear at large incident angles with respect to the camera axis may appear slanted and as such may be represented in an atlas by a block with high aspect ratio (e.g., a skinny rectangle). Depending on camera motion, the triangle appearance in screen space may gradually change, and consequently the corresponding block's size and aspect ratio may change too. In instances of shading atlas organization where the column widths are restricted to powers of two, there may be a restricted number of block sizes and aspect ratios which are available in the atlas, and so the switch of a block from one column-width superblock to another may not be very frequent or continuous in time.

Furthermore, in order to preserve the aforementioned temporal coherence within the atlas, a block, once added to the atlas, may be restricted to occupy the same place for as long as possible subject to some constraints. A block location in a shading atlas may change once: (i) its screen space area and aspect ratio become increasingly inappropriate for the current superblock column width, so the switch becomes necessary, or (ii) the block ceases to be in the potentially visible set for a prolonged period of time. In both these situations, the block in question must be moved within the atlas or removed altogether—specifically in case (ii). The change may result in a temporary increase in the encoded bitrate, but the new state may persist a while leading to overall lowering the encoded bitrate. In addition to cases (i) and (ii), there can be additional reasons for blocks to change their location within shading atlas. In some implementations, the shading atlas temporal evolution may be interrupted occasionally to introduce atlas reset events. Atlas reset events may be needed in order to keep the memory fragmentation or atlas over-utilization in check. During atlas resets, the block allocation for all the currently potentially visible blocks is re-determined anew which often results in most blocks changing their location in the atlas. Certain blocks can also be removed from or added to the atlas during atlas reset events. When shading atlas sequence is encoded using IPPP structure common in moving picture experts group (MPEG) family of encoding standards, the atlas reset events may be synchronized with periodic insertion of I-frames, since the disruption of temporal coherence in I-frames does not lead to significant increase in encoded bitrates. In order to facilitate fast memory lookups, both horizontal and vertical block sizes are kept as powers of two. For instance, a block may be 16 pixels tall and 64 pixels wide. This block would be assigned to a superblock containing blocks that are all 64 pixels in width. When the headset position changes so that the block's aspect ratio appears much closer to 1:2, and slightly larger in size, the block will be removed from its current location, and it may be assigned 32 pixels in heights and 64 pixels in width. In this case, it may again be allocated to a superblock of width 64, but it would need to change its place.

As indicated above, vector streaming transport can also include meta-information, which is sent along with each encoded shading atlas (thus once per server frame). This meta-information may for instance describe the triangle-to-block assignment (which is transported once upon the beginning of service), or block-to-superblock assignment and location of the block within the atlas (both of which may change from frame to frame). The client can use the meta-information to determine how to map the surfaces in the shading atlas to the visible mesh triangles projected in the screen space during the rasterization step performed on the client. In some aspects, two different eye buffers can be formed by the client using the shading atlas, the mesh geometry, the meta-information, and the most recent client pose.

In some aspects, shading information can be sent from a server to a client device using the shading atlas. The shading atlas can also be video encoded. In some instances, even though the encoded shading atlas may conform to a standard moving picture experts group (MPEG) based stream, at least some of the properties of the encoded bit stream and/or some information included in the shading atlas can be unique. For instance, the encoded video stream may contain multiple slices, which may be chosen such that each slice contains full (and not partial) superblocks. This is always possible if the atlas is partitioned into an integer number of superblocks, and all superblocks are of the same size. Moreover, the shading atlas stream may occasionally be corrupted by the transmission media, interference, or other causes. The corruption in the video stream may be such that it results in a decodable video, but such where certain portions of certain frames cannot be decoded properly or may otherwise appear corrupted upon decoding.

In some instances, the screen space can include a number of different surfaces, such as surfaces that occlude other surfaces in the screen. Therefore, the shading atlas and the meta-information can help to explain these different surfaces, their shape, size, and appearance on the screen, e.g., the information that a client device may need to render the scene in a correct manner.

Figure 3:
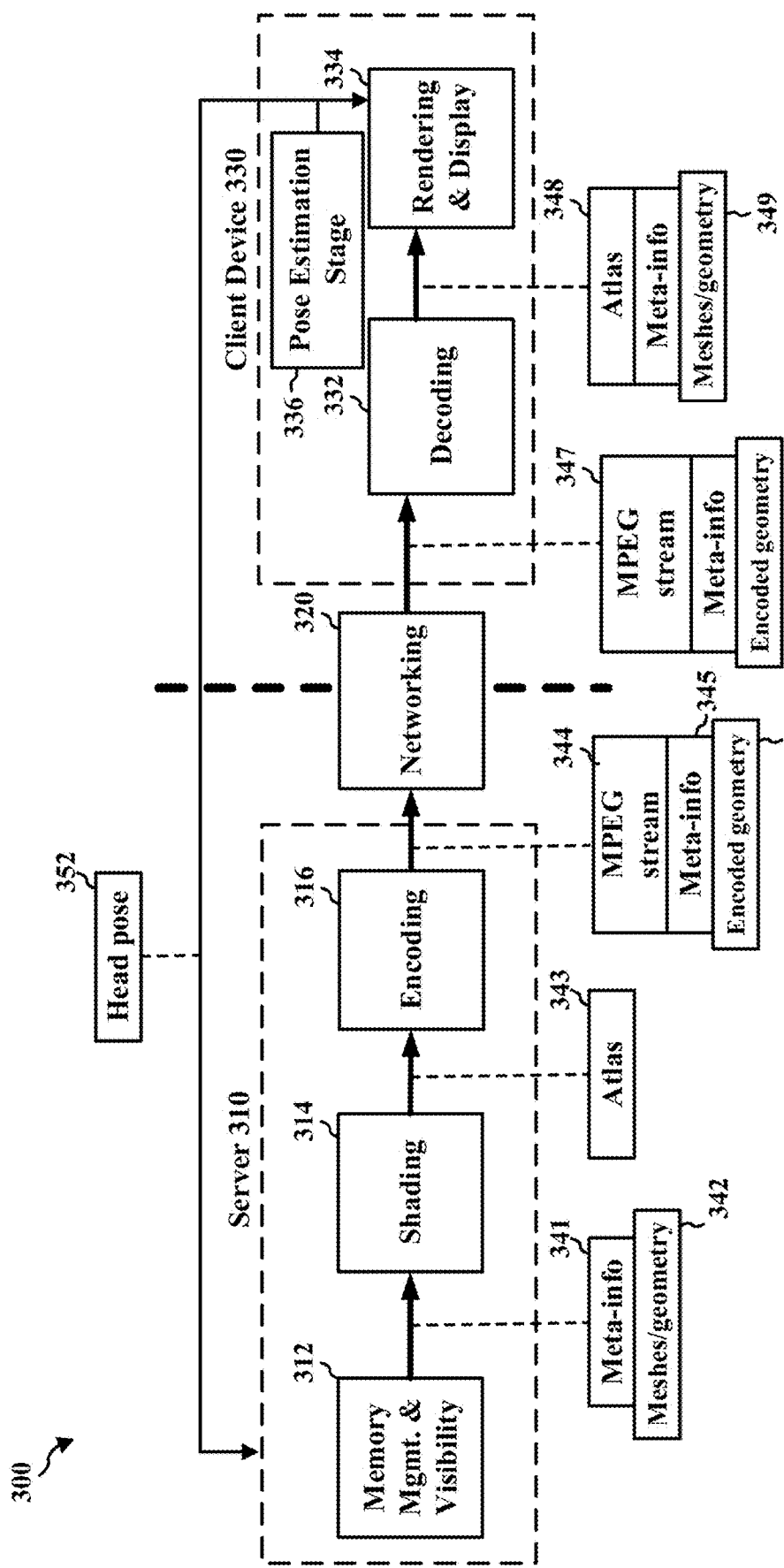
FIG. 3 illustrates an example diagram including communication between a client device and a server in accordance with one or more techniques of this disclosure.

FIG. 3 is an example architecture 300 for split rendering between a server 310 and a client device 330. More specifically, architecture 300 illustrates a vector streaming transport system including the information transfer protocol between server 310 and client device 330. Diagram 300 includes server 310, networking 320, and client device 330. As shown in FIG. 3, the server 310 includes visibility and memory management stage 312, shading stage 314, and encoding stage 316. The client device 330 can include decoding stage 332, display stage 334, and pose estimation stage 336.

As shown in FIG. 3, meta-information 341 can be determined following the memory management process in stage 312. The visibility process in stage 312 may determine the relevant geometry and/or mesh data 342 that will be sent to the client device 330 in the current frame. The shading atlas 343 is a result of the shading stage 314 and is encoded for transport over the network 320 to the client 330 in the encoding stage 316. The encoding stage 316 may be responsible for encoding the series of shading atlas frames 343 into an MPEG stream 344. The encoding stage may also be responsible for compressing and forward-error-correcting the meta-information 345 and/or the geometry/mesh data 346. MPEG stream 344, meta-information 345, and encoded geometry 346 can be transported from the server 310 to the client 330 via the network 320. In some instances, the MPEG stream 344 may be corrupted in network 320, and thus the received MPEG stream 347 may not exactly correspond to the transmitted MPEG stream 344. In addition, in some instances, the meta-information and the encoded geometry may be more resilient to the transport medium, or they may be sent via protocols that are more reliable so that the client receives them uncorrupted. The client decodes the received streams in the decoding stage 332. The meta-information and the geometry and/or mesh data reconstructed after the decoding stage 332 may in some instances exactly match the corresponding data on the server 310, e.g., meta-information 341 and geometry and/or mesh data 342. However, if the MPEG stream was somehow corrupted, the reconstructed shading atlas frames 348 may not match the shading atlas frames 343 prepared on the server 310. After decoding, shading atlas frames 348 and decoded meta-information 350 as well as the decoded geometry/mesh data 349 can be used by the rendering and display stage 334 along with the most recent pose information 352 in order to render the left and right eye buffers and display them on a screen (not shown in FIG. 3) at the client device 330.

As indicated above, the shading atlas MPEG stream may be subject to lossy transmission where some information packets may experience errors, such as being dropped, corrupted during transport, or not accurately decoded. In some instances, the lost information packets may translate to reconstructed atlas frames that are partially inaccurate. Unless the affected information packets carried some critical information (e.g., the system header), the effect of random occasional packet loss may be more space/time limited. For instance, one lost real-time transport protocol (RTP) packet in a stream may affect one MPEG slice if slices are organized such that no RTP packet spans more than one slice. This in turn means that a corrupted or dropped RTP packet may result in several superblocks of the incoming atlas being decoded incorrectly.

In some aspects, video transport systems can offer some level of resilience to network behavior, such as sporadic packet loss and/or sporadically increased delays over the network. Some video transport systems, e.g., streaming video systems, can rely on buffering and stock error concealment. However, buffering may not be an option for latency sensitive content, such as split rendering architecture, e.g., cloud gaming, split XR, split AR, or split VR, where a good portion of the rendering operations are performed remotely on the server, i.e., away from the pose estimation unit 336 and where it is desirable to keep end-to-end system latency low. Also, stock error concealment may work for errors in certain types of macroblocks (MBs), e.g., intra-coding MBs (I-MBs), inter-coding MBs, or predictive-coding MBs (P-MBs), where successfully decoded content from previous frames or neighboring macroblocks of the current frame can be used to conceal any current error. However, such techniques were developed specifically for natural video data abundant in spatial coherence between neighboring blocks, and it usually does not work well with computer graphics content in general and even more so with shading atlas content with little or no spatial correlation.

In some aspects, the video streamed in vector streaming transport systems can have different properties compared to other systems. For instance, unlike natural or pixel streaming graphics content, regions in a vector streaming shading atlas correspond to object-space appearance, rather than screen-space appearance. Due at least in part to this, two neighboring macroblocks in a shading atlas may be very different in appearance, especially if the neighboring macroblocks align with two (or more) different vector streaming blocks 280. Moreover, since the blocks that make up the superblocks and the atlas itself always correspond to the same physical surfaces in object space, and they contain a unique block identifier, the frame-to-frame content correspondences can be easier to determine. Due to a different nature of video content, there is a present need for video transport in vector streaming to include a separate or specialized error concealment algorithm.

Aspects of the present disclosure can include a specialized error concealment algorithm for vector streaming systems. For instance, a vector streaming system can stream information regarding how blocks from one shading atlas correspond to r blocks from another shading atlas. This can make it possible for the present disclosure to determine on the block-level whether a corresponding block was received in a previous information transfer, and if so, when the previous information transfer occurred. In some instances, a missing block in a current shading atlas may include a number of pixels, e.g., N pixels, and a corresponding block from a previous successfully-decoded shading atlas may be represented using another number of pixels, e.g., M pixels, where M can be smaller or larger than N. The information about block size in each atlas frame also is available and may be used by the client device 330 for atlas-space error concealment.

As indicated above, each block can include information describing where the block is located in the shading atlas. In addition, previous block location information from missing blocks can be included in previous shading atlases. Accordingly, a missing block of the current shading atlases can be retrieved from previous shading atlases. Therefore, vector streaming systems can stream information from one shading atlas to another shading atlas, which can be utilized by the present disclosure to locate current missing surface information based on previous surface information.

In some aspects of the present disclosure, missing blocks, e.g., a dropped or otherwise not properly decoded blocks, may be found to have been correctly received and decoded in one of the previous shading atlases. Also, the corresponding meta-information can be assumed to be available/unchanged or reliably received at the client side. In addition, while this information can typically be streamed at a higher reliability, the technology of the present disclosure can also include an algorithm to circumvent occasional losses of meta-information. A vector streaming client device can use this information to locate a recent copy of the presently missing block, which can describe the same physical surface in object space as a previous, correctly decoded, block. Also, a vector streaming client can update its other inner state parameters to make the occasions of block-level concealment transparent to the client renderer. For instance, if a block was not decoded correctly in this frame, the corresponding pointers may be modified to point to a recent copy of the same block, or the latest draw buffer may be generated using a combination of the latest decoded texture and pieces of the previously decoded textures. In this way, the rendering operation remains agnostic to the fact that error concealment took place.

As indicated above, when a scene is being rendered on a client device, geometry information and block information (e.g., meta-information) may be needed. The rendering unit rasterizes geometry of visible meshes to the screen space and texture-maps the shaded surfaces of those meshes using the block representation portrayed in shading atlas. The current block representation can be obtained from the most recent decoded shading atlas, or—in case of transmission errors—from a different location, referencing a previous instance of the received block. In addition, the latest version of the block when decoded correctly can be stored in memory, e.g., internal memory. Therefore, anytime a block is correctly received, the block can be stored and the client may maintain the most recent correct rendition of the block. This memory storage can be retained for a certain period of time, e.g., 1 second, which may be determined by the maximum available storage on the client.

Additionally, if there is an error for a received block in the current frame, the present disclosure can determine if the block representation is correctly stored elsewhere in the memory. Therefore, aspects of the present disclosure can utilize accurately received prior block information for current rendering. Alternatively, if the block corresponding to the latest frame update is missing or inaccurate, then the successfully decoded version of the missing/inaccurate block can be retrieved. Moreover, the system parameters can be updated to indicate that the stored previous block representation is used for rendering the next frame, as opposed to the missing or incorrectly decoded present block representation.

In some instances, representation of blocks in the shading atlas can change in size or aspect ratio over time. For instance, object space rendering can render a shading atlas, where the surfaces in the shading atlas correspond to specific surfaces on a mesh of the object. Depending on the camera view, a block may appear to be of a different shape or size. Also, the aspect ratio can be stretched depending on the camera view. In some aspects, the client device can know about the current size and aspect ratio requirement for all blocks from the meta-info, and if a block is missing or decoded incorrectly in the current atlas, the client device can utilize previously received correctly-decoded instances of the block and re-shape the block to fit the current block size and aspect ratio.

As indicated above, some aspects of the present disclosure can determine if a block is accurately decoded from a current shading atlas. If the block is accurately decoded, the present disclosure can maintain the block representation and inform the client renderer to proceed with rendering. If the block is not accurately decoded, examples of the technology disclosed herein can determine if the block was represented in a recently accurately decoded shading atlas. If the block was represented in a recently-stored successfully decoded shading atlas, or was stored separately, the present disclosure can use this previous block representation to represent the block in the current shading atlas. Aspects of the present disclosure can also update the system parameters in order for the client renderer to proceed rendering without any delays.

If a block was not accurately decoded previously and available in client memory, examples of the technology disclosed herein can utilize other methods, e.g., video in-painting methods. This may be the case with previously unseen content, for instance, if a block appears in the potentially visible set for the first time since the start of rendering, yet it is the first-transmitted representation in a shading atlas was not received or decoded accurately. Additionally, examples of the technology disclosed herein may include a number of different features aimed at using the error-concealed blocks to prevent the error propagation in the decoded video content. The error concealment directly affects the rendering part of the client. However, the video decoder part may also benefit from correcting the corrupt information. Since the video decoder depends on its previous state when decoding all inter-coded/predictive-encoded macroblocks, a corrupt block in one decoded atlas will typically propagate the error in the consequent frames until the corresponding MBs are intra-encoded (for instance, in an I-frame). This is one reason that the error concealment information may also be propagated to the state of the decoder, in order to rectify the information that may be used when decoding future predictive-encoded macroblocks.

As indicated herein, if a block is received accurately or correctly, then the client device can render the block as-is. In addition, the accurately/correctly decoded block, and in some cases the block's meta-information, can be stored, e.g., in memory, for use at a later time. If a block is not received accurately or correctly, the present disclosure can determine the last received atlas that includes this block and where the block is located in the shading atlas. Alternatively, the client may store each successfully decoded instance of a block separately—not within an entire shading atlas. If the blocks are stored separately, then the client may consult a block storage table to determine: (i) whether the block was successfully received in the past, (ii) if so, where it was stored, and (iii) what are the block's dimensions in the previous successful depiction. The previously correctly-decoded block can then be retrieved on an individual basis using the most recently-decoded instance of the same block, and consulting the storage table to determine its location in memory.

There may be advantages to storing individual block representation versus storing entire shading atlases. For instance, any given correctly-decoded shading atlas contains a subset of all the blocks associated with a scene. Thus, in order to maintain at least one correct instance of each block ever received, the client may need to store a very large number of shading atlases with many duplicated block representations. In contrast, if the blocks are stored individually, the client may retain the most recent correct representation of the particular block, allowing the other representations to be over-written or otherwise controlled by the garbage collection function of the client device operating system.

Furthermore, as the location of each block may vary from frame to frame, finding the most recent atlas that contains a block, and then finding where the block is stored in the atlas may require sifting through a number of meta-information messages, which describe the block-to-atlas location mapping. In the examples where each block is retained individually, the client device can update the block storage table when a new representation of a block has been successfully decoded and stored, which then simplifies the lookup process in time of error concealment.

On the other hand, there can be certain advantages of storing on the client the compact atlas representations instead of individual blocks. For instance, the shading atlas representations have a benefit of already having undergone tight memory management scheme on the server, which promotes a rather tight memory footprint for each individual atlas. If only a small number of shading atlases are retained in the memory (five to ten, for instance), which may be consecutive atlases or atlases separated by K instances: e.g., atlas number L, atlas number L+K, atlas number L+2K, etc., where K may be a small integer larger than one, then the required total memory footprint on the client may be rather moderate. As opposed to this, if storing individual blocks is pursued instead, the client needs to maintain the memory management that can require extra compute resources and could lead to larger memory footprints if not managed timely or properly. Examples of the technology disclosed herein describe the mechanisms of block-level error concealment when either strategy is used and the selection of the appropriate strategy may depend on specific client architecture and requirements.

In some aspects of error concealment in vector streaming, examples of the technology disclosed herein can determine how a vector streaming client device may react in the case of packet losses. In some instances, I-frames can be inserted in regular intervals, e.g., every five frames, to stop error propagation. In addition, each shading atlas reset event may result in inserting a new I-frame in order to efficiently encode the radical changes in the block locations within the atlas. In some aspects, messages and other meta-information can be transported error-free, e.g., on a transmission control protocol (TCP) link, or with various levels of reliability as made possible by reliable user datagram protocol (RUDP).

Additionally, aspects of the present disclosure can also include a number of current video encoder settings. For instance, an atlas frame can be divided into horizontal bands, i.e., video slices. In addition, losing a network packet from the video bit-stream may result in corrupting the entire slice, e.g., an encoded bit-stream corresponding to the slice may be non-decodable. Further, a video decoder can apply decoder error concealment. For an I-frame, the slice can be filled with a constant color, such that no reference frame may be used for concealment. For macroblocks in a P-frame, or predictive-encoded macroblocks, the video decoder can propagate the last correctly decoded reference macroblock, e.g., along the best known or extrapolated motion vectors.

Aspects of the present disclosure can include a number of structures for shading atlas slices. As indicated above, atlas filling can be in vertical direction in order to have all the horizontal slices in a frame contain roughly the same amount of "occupied" content. Aspects of the present disclosure can align video slice boundaries with atlas superblock boundaries whenever possible. Moreover, encoded packets may also be aligned so that a single packet never describes more than one video slice. This can be done to minimize the number of atlas blocks affected by a packet loss. In addition, when a slice is lost, a client renderer may attempt to conceal all of the included blocks. In some instances, a client can store at least the last correctly decoded atlas to be used for error concealment. In this scenario, a client must gather all the meta-information describing the affected block evolution between the previous and the current atlas. A client device may also store more than one correctly decoded atlas from the recent past in order to increase the likelihood that a block affected by the current missing slice was received and stored correctly. Finally, a client may store a group of all previously received and correctly decoded blocks that may or may not be arranged in a contiguous memory. A client device may update the block every time a new version of the block is successfully decoded. A separate table may be maintained in order to specify the block identifier, the memory location, and size/dimensions of its most recent representation, sometimes referred to as a block storage table. This information may be sufficient in order to perform error concealment of the effected block in the current frame.

In some aspects, in order extrapolate representation of blocks that were never correctly received, examples of the technology disclosed herein can fill missing triangles in rendered eye buffers using an average value of all the neighboring correctly-received triangles. Further, if a majority of the slice effected by packet loss in the current frame has been received properly in one of the recent frames, then ATW error concealment from the last correctly rendered frame may be used instead of color-average in-painting.

In some instances, the term frame may denote what is rendered by the client, as well as denote what is rendered on the server and sent to the client, as in a shading atlas. Additionally, the frames rendered by the client may be referred to as eye buffers (EBs)—e.g., one for each eye in an XR display. For example, this can be what is expected at the client display in XR applications of a split rendering architecture. The term frame may also refer to the product of server rendering, e.g., a result of consuming one head pose in a game engine rendering pipeline. Frame can also refer to the totality of information received by the client (e.g., over the network) as a result of the server rendering and otherwise processing a head pose. In some instances, the rate of generating server frames may be lower than the rate of generating eye buffers on the client. For example, server frames may be generated at 20 Hz and client eye buffers may be generated at 60 Hz or 90 Hz depending on the HMD display. Thus, multiple EB pairs may be generated for each one frame sent by the server. Moreover, each of these EB pairs may utilize a different head-pose, e.g., as the HMD moves around in-between consecutive updates from the server.

Figure 4:
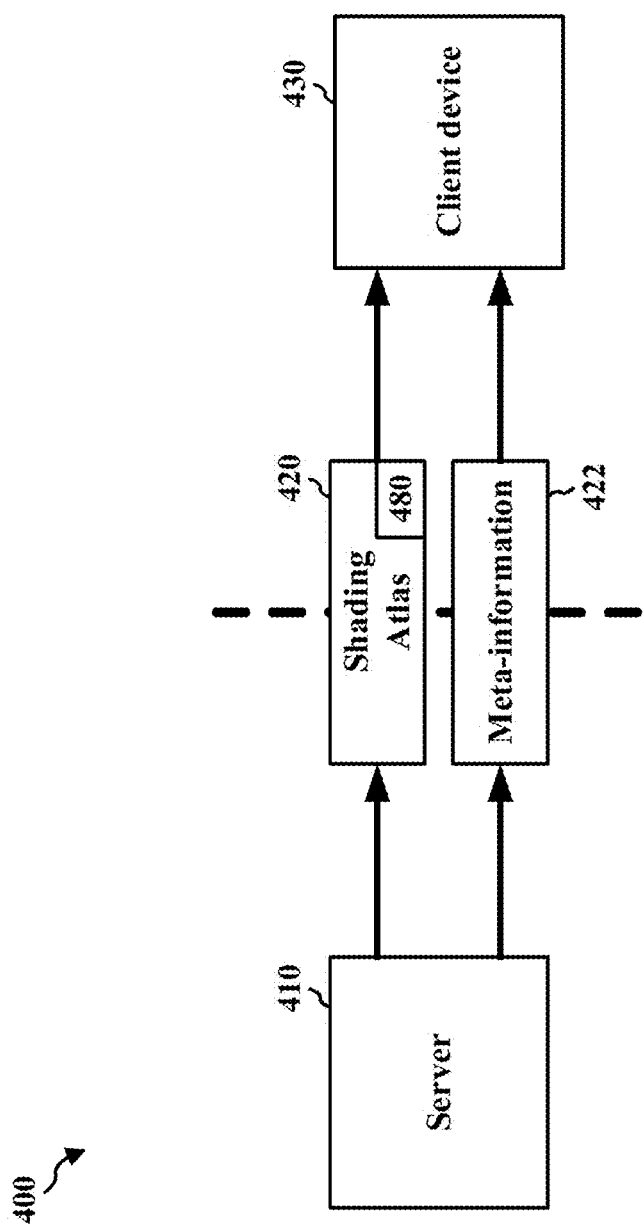
FIG. 4 illustrates an example diagram including communication between a client device and a server in accordance with one or more techniques of this disclosure.

FIG. 4 illustrates a diagram 400 including communication between a server 410 and a client device 430. More specifically, diagram 400 is a vector streaming process including information transfer between server 410 and client device 430. As shown in FIG. 4, diagram 400 includes server 410, shading atlas 420 including at least one block 480, meta-information 422, and client device 430. In some aspects, the server 410 can include a game engine and/or video and audio encoders. In addition, client device 430 can include a headset, an HMD, other multimedia user device equipped with at least one display, and/or video and audio decoders.

FIG. 4 illustrates an example of the aforementioned processes of a split rendering system. For instance, aspects of the present disclosure, e.g., servers and client devices herein, can perform error concealment during vector streaming. For example, client devices herein, e.g., client device 430 in FIG. 4, may receive at least one shading atlas, e.g., shading atlas 420, including one or more blocks. Client devices herein can also decode the at least one shading atlas, e.g., shading atlas 420, including the one or more blocks.

Additionally, client devices herein can determine whether at least one block of the one or more blocks, e.g., a block in shading atlas 420, is accurately decoded, where the at least one block can include information shaded on the server, e.g., using a recent game state and a head pose. Client devices herein can also render a portion of a frame based on the block when the at least one block, e.g., a block in shading atlas 420, is accurately decoded. In some aspects, the portion of the frame can be rendered based on display content of the at least one block, e.g., a block in shading atlas 420. Moreover, client devices herein can store block representation for at least one block when the at least one block, e.g., block 480 in shading atlas 420, is accurately decoded. In some instances, client devices herein can also store the decoded at least one shading atlas, e.g., shading atlas 420, including the one or more blocks when the at least one shading atlas is accurately decoded. If shading atlases are being stored, some client implementations described herein would also store meta-information (block information) corresponding to all stored shading atlases Client devices herein can also identify a previous version of the at least one block when the at least one block, e.g., block 480 in shading atlas 420, is not accurately decoded, e.g., in the current server update or frame. In some aspects, the previous block can be further identified based on the affected block 480 unique identifier, cumulative meta-information, e.g., meta-information 422, received by the client between the last correctly-decoded instance of block 480 and the present time, and the shading atlas containing the previous correctly-decoded representation of block 480. Alternatively, the previous pixel information of block 480 can be read from the last accurately decoded instance of the block 480 stored at the client and the block storage table that maintains the memory address of this storage.

In addition, client devices herein can conceal the error of at least one corrupted block based on the previous version of the at least one block. In addition, client devices herein can render a portion of a frame based on the error-concealed block or the at least one corrupted block when the at least one block, e.g., block 480 in shading atlas 420, is not accurately decoded.

In some aspects, the at least one shading atlas, e.g., shading atlas 420, including the one or more blocks can be received from a server, an edge server, or a cloud server, e.g., server 410. Also, the at least one shading atlas, e.g., shading atlas 420, including the one or more blocks can be received by a client device, a headset, or a head mounted display (HMD), or any other multimedia device with at least one display, e.g., client device 430. In some instances, the determination whether the at least one block of the one or more blocks, e.g., a block in shading atlas 420, is accurately decoded can be at least partially performed by a GPU, a CPU, or a dedicated hardware decoder. If a block is accurately decoded, the client can use it to render the current frame. It can also be stored by the client to replace the previous accurately decoded instance of the block in question. Conversely, if the block was not accurately decoded in the current frame, the client may use a lookup table to identify if the corrupted block has been previously accurately decoded and stored by the client, may use another cataloging method to identify where such previous instance of the block is stored in the client memory, and may use the cumulative meta-information to determine the previous dimensions of the block and/or how that previous block should be mapped to conceal the current instance of the block which was not accurately decoded. Alternatively, the previous dimensions of the block may also be stored on the client in the cataloging method, i.e., in a lookup table, hash table, etc. Moreover, when an entire slice of shading atlas, containing multiple currently missing blocks, i.e., inaccurately decoded blocks, has been successfully error-concealed from the client's memory, this pixel information may then be propagated on the client into the video decoder inner memory and used to replace/modify the corresponding video macroblocks that could not be correctly decoded in the present frame. This approach error-conceals the entire slice (comprising blocks), and then the error-concealed slice is used to modify each individual MB within the slice. The at least one shading atlas, e.g., shading atlas 420, including the one or more blocks can be received for an XR application, an AR application, VR application, or any other split rendering multimedia application.

Some aspects of the present disclosure can (1) receive and decode a shading atlas. Then, for each block in the decoded atlas, the present disclosure can (2) determine if the block is (a) accurately decoded or (b) corrupted. If (2a), the present disclosure can: (i) save a current block representation and block meta-information appropriate for locating the correctly decoded block (such as a block identifier), and/or over-write the previous instance of the same block, (ii) use this previous instance of the same block on a client to render the next frame. If (2b), the present disclosure can (i) determine whether the previous instance of the corrupted block has been saved on client. If so, the present disclosure can determine appropriate previous instance of the block in order to error-conceal the corrupted/missing block using previously-stored block. Previous instances of correctly decoded blocks can be retrieved from client memory using the block location information, which may be maintained by the client (typically used when the client stores individual block representations directly in memory), or retrieved by the client using the stored meta-information (typically used when the client stores entire past shading atlases). The present disclosure can also use this error-concealed version of the block for client rendering. In addition, the present disclosure can propagate the error-concealed block to macroblocks inside the video decoder (this can be optional). If the previous correctly decoded instance of a corrupted block was not saved, then the present disclosure can determine pixel information by one of several video correction techniques: in-painting for the block pixel information, error concealment in screen space, post-client rendering using previously-rendered frames and the knowledge about the affected area in screen-space using the corrupted block's identifier, constituent triangle identifiers, corresponding vertex information, and/or the latest camera pose used for client rendering. However, if the block is error-concealed, the present disclosure can use that version for client rendering, except when the error concealment may not be applied to corrupted blocks but rather to the rendered frame directly.

Figure 5:
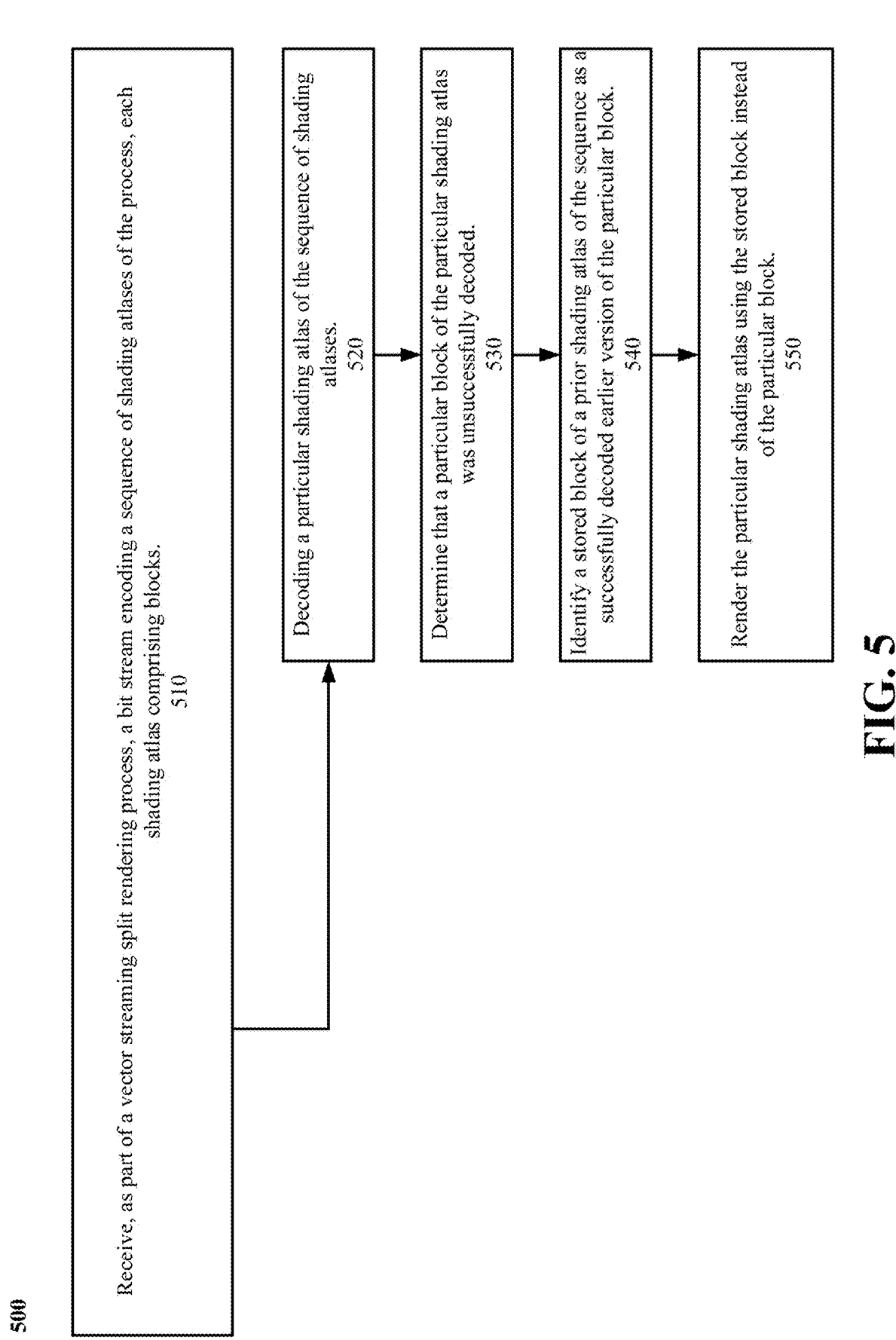
FIG. 5 illustrates an example flowchart of an example method in accordance with one or more techniques of this disclosure.

FIG. 5 illustrates an example flowchart 500 of an example method in accordance with one or more techniques of this disclosure. The method may be performed by an apparatus such as a client device, a CPU, a GPU, or an apparatus for graphics and/or video processing.

In such methods, a client device receives, as part of a vector streaming split rendering process, a bit stream encoding a sequence of shading atlases of the process, each shading atlas comprising blocks—Block 510. In a continuing example referring to FIG. 3, the encoding stage 316 of server 310 had encoded a series of shading atlases 343 into an MPEG stream 344. The encoding stage 316 also compressed and forward-error-corrected the meta-information 345 and the geometry/mesh data 346. MPEG stream 344, meta-information 345, and encoded geometry 346 are received by the client 330 from server 310 via the network 320.

In such methods, the client decodes a particular shading atlas of the sequence of shading atlases—Block 520. In the continuing example, the client 330 decodes the received streams in the decoding stage 332. The meta-information 345 (including block identifiers) and the encoded geometry 346 are reconstructed after the decoding stage 332, matching the corresponding data on the server 310, e.g., meta-information 341 and geometry and mesh data 342.

However, the client determines that a particular block of the particular shading atlas was unsuccessfully decoded—Block 530. In the continuing example, the shading atlas MPEG stream 344 is subject to lossy transmission and some information packets carrying information of the particular shading atlas experienced errors.

The client identifies a stored block of a prior shading atlas of the sequence of shading atlases as a successfully decoded earlier version of the particular block—Block 540. In the continuing example, the client 330 uses the block identifier from the meta-information 341 and the internally stored information to identify an instance of a stored version of the particular block as being the most recent, successfully decoded, version of the particular block.

The client then renders the particular shading atlas using the stored block instead of the particular block—Block 550. In the continuing example, the client replaces the corrupt representation of the particular block from the particular shading atlas with the most recent correctly decoded copy of this block from internal storage and uses this concealed representation of all the visible blocks in the current atlas to render the latest frame. In particular, in the continuing example, rendering and display stage 334, in cooperation with pose estimation stage 336 uses this most recent representation of the particular block to render the latest frame. Rendering and display stage 334 and pose estimation stage 336 are agnostic with respect to the source of the particular block or that the unsuccessfully decoded block was replaced with an earlier successfully decoded version.

Figure 6:
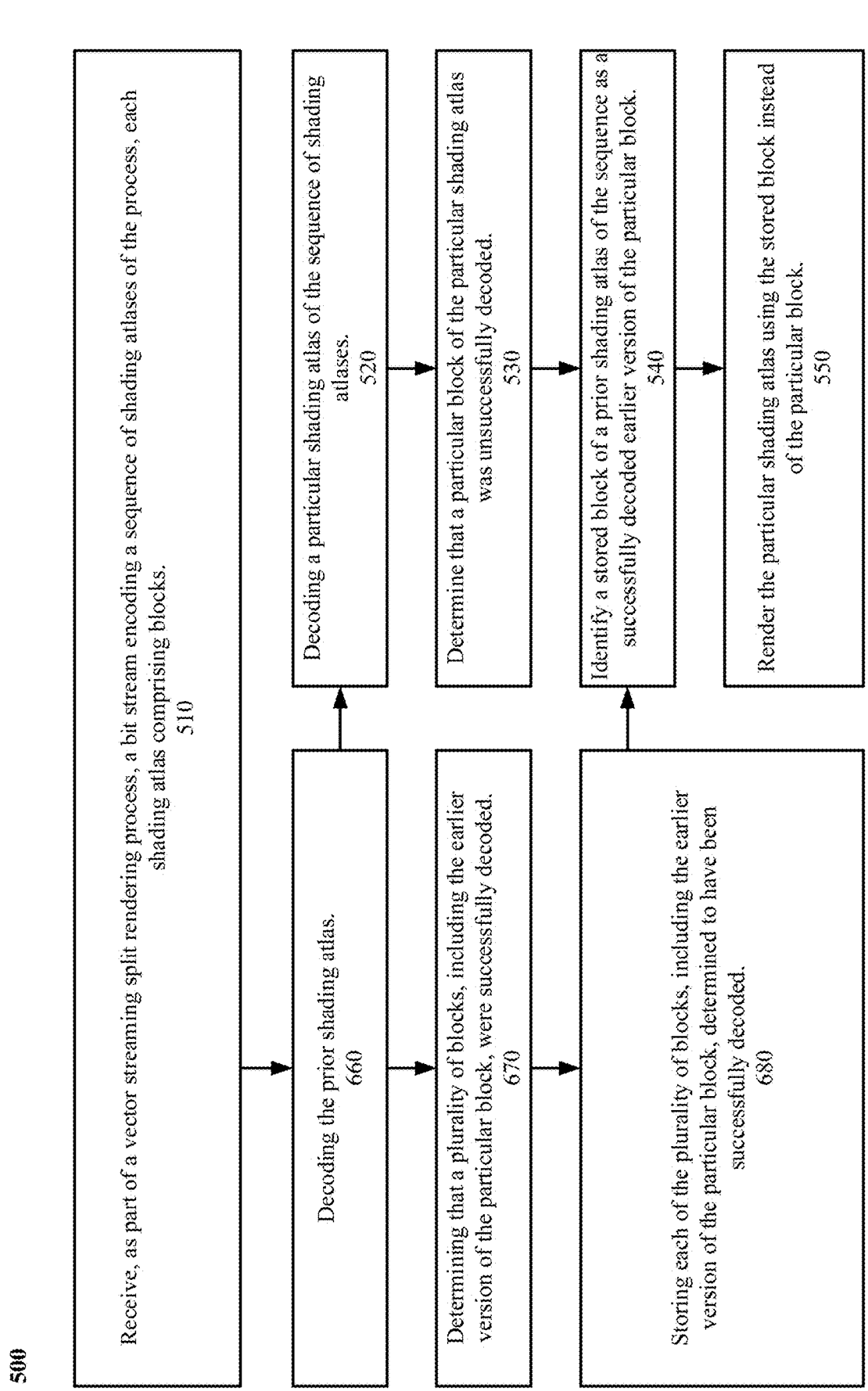
FIG. 6 illustrates an example flowchart of an example method in accordance with one or more techniques of this disclosure.

Referring to FIG. 6, and continuing to refer to prior figures for context, methods 600 of graphics processing in a client are shown, in accordance with one or more techniques of this disclosure. In such methods 600, Block 510—Block 550 are performed as described above in conjunction with FIG. 5. In such methods, prior to decoding the particular shading atlas, the client decodes the prior shading atlas—Block 660. In the continuing example, as with the later particular shading atlas in the sequence of shading atlases, the client 330 previously decoded each shading atlas in the received stream in the decoding stage 332. The meta-information 345 and the encoded geometry 346 are reconstructed after the decoding stage 332 decompresses the incoming stream thus matching the corresponding data on the server 310, e.g., meta-information 341 and geometry and mesh data 342.

In such examples, the client determined that a plurality of blocks, including the earlier version of the particular block, were successfully decoded—Block 670. In the continuing example, decoding stage 332 indicates which blocks in the atlas were decoded incorrectly and which are correctly decoded. Client 330 successfully decoded an earlier version of the particular block.

The client stores each of the plurality of blocks, including the earlier version of the particular block, determined to have been successfully decoded—Block 680. In the continuing example, the client 330 stores the successfully decoded earlier version of the particular block in internal memory 121 of processing unit 120. In particular, in the continuing example, storing the earlier version of the particular block includes storing the prior shading atlas, and maintaining a block-to-shading-atlas location mapping specifying the most recent atlas that contains the earlier version of the particular block. For example, client device 330 stores the last shading atlas and also stores meta-information (block information) corresponding to the last shading this atlas, replacing the oldest stored atlas and the corresponding meta information. When the particular block has been determined to have been incorrectly decoded, the client identifies the most recently stored shading atlas that contains the first block correctly decoded as the most recent version of the particular block.

In other examples, storing the first block includes storing the first block apart from the shading atlas of the first frame determined to be successfully decoded in the latest frame, and maintaining a block storage table specifying a block identifier of the particular block as well as the physical location in memory where the block is stored as well as the corresponding meta information. In doing so, the client overwrites any previous stored representations of the stored block and the corresponding meta information. In such other examples, client device 330 stores a representation of the successfully-decoded earlier version of the particular block, sufficient for using the earlier version in place of a missing or otherwise unsuccessfully decoded subsequent version of that block, in a block storage table (or equivalent data structure). The client then identifies the stored copy of the last successfully decoded version of the particular block by a block identifier using the known block identifier as the key in the block storage table and retrieve the stored first block location in memory.

In some implementations there is an allocated section in memory for storing the latest correctly decoded blocks. The client can identify the last copy of the particular block, which is now stale, clear that, and write the latest successfully decoded version of the particular block. The client then stores the pointer to this latest copy of the successfully decoded version of the particular block in the table, as well as the size of the block—so the error concealment process knows how many bytes to read from there and use this to replace the corrupted block. The client also stores the corresponding meta info—it contains the size of the block (width/height) of the last stored copy of the successfully decoded version of the particular block. The client then can compare these to the meta info of the unsuccessfully decoded version of the particular block, and use this comparison to scale appropriately the old copy to replace the new corrupted copy.

Figure 7:
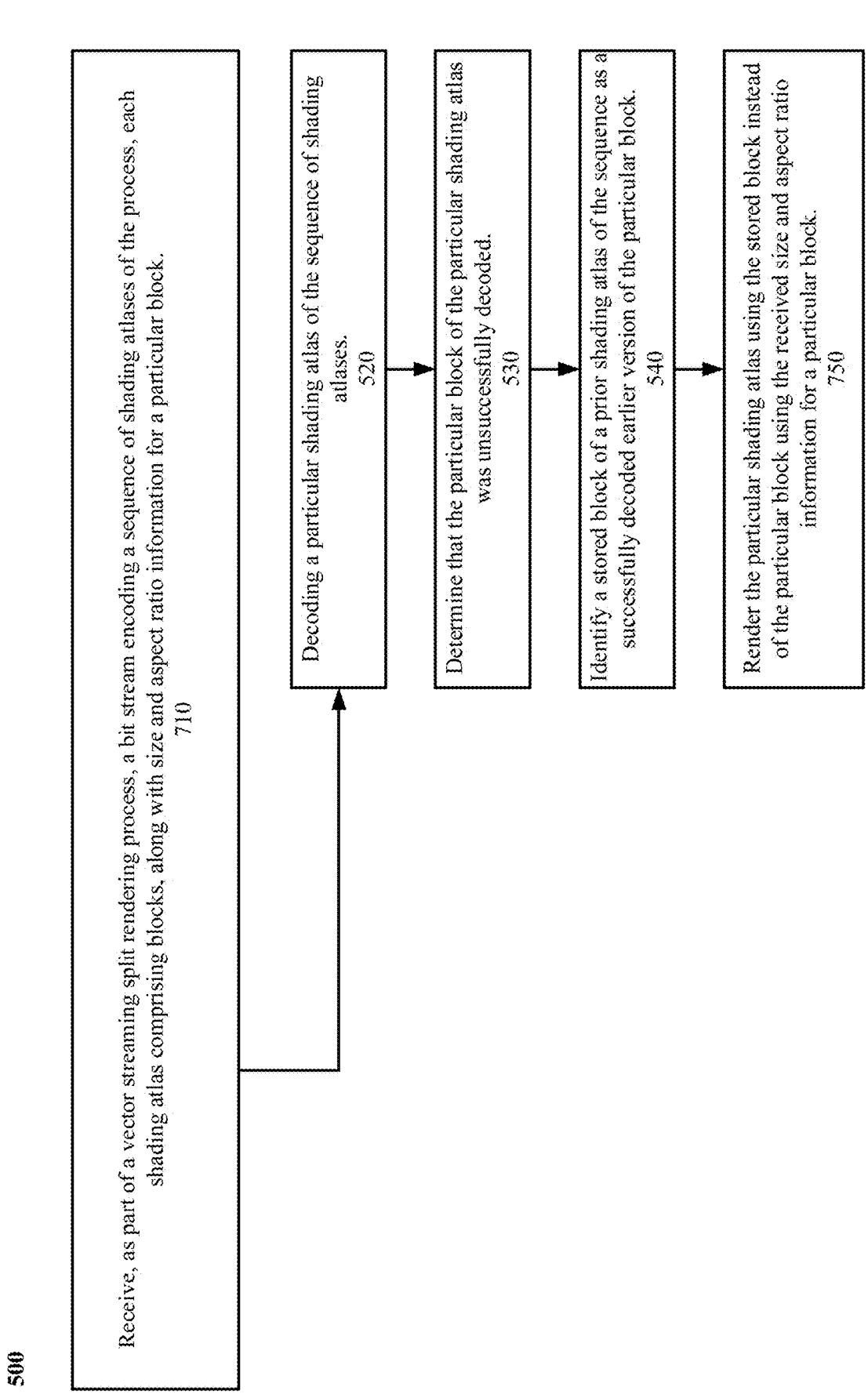
FIG. 7 illustrates an example flowchart of an example method in accordance with one or more techniques of this disclosure.

Referring to FIG. 7, and continuing to refer to prior figures for context, methods 700 of graphics processing in a client are shown, in accordance with one or more techniques of this disclosure. In such methods 700, Block 520—Block 540 are performed as described above in conjunction with FIG. 5. In such methods, the client receives, as part of receiving the bit stream, size and aspect ratio information for the particular block determined to be unsuccessfully decoded—Block 710. In such methods, the rendering first comprises reshaping the stored block based on the received size and aspect ratio information—Block 750.

In some examples, the client 330 uses the stored first block as feedback to the decoding stage 332 as previous state information for the decoding stage 332.

In some aspects, the at least one shading atlas including the one or more blocks can be received from a server, an edge server, or a cloud server, as described in connection with the examples in FIGS. 2A, 2B, 3, and 4. Also, the at least one shading atlas including the one or more blocks can be received by a client device, a headset, or a head mounted display (HMD), as described in connection with the examples in FIGS. 2A, 2B, 3, and 4. In some instances, the determination whether the at least one block of the one or more blocks is accurately decoded can be at least partially performed by a GPU or a CPU, as described in connection with the examples in FIGS. 2A, 2B, 3, and 4. Further, the at least one shading atlas including the one or more blocks can be received for an XR application, an AR application, or a VR application, as described in connection with the examples in FIGS. 2A, 2B, 3, and 4. In some aspects, the previous pixel information can include the stored updated pixel information, as described in connection with the examples in FIGS. 2A, 2B, 3, and 4. In some aspects, the portion of the frame may correspond to a portion of at least one eye buffer, as described in connection with the examples in FIGS. 2A, 2B, 3, and 4.

In some examples, a method or apparatus for graphics processing is provided. The apparatus may be a server, a client device, a CPU, a GPU, or some other processor that can perform graphics processing. In one aspect, the apparatus may be the processing unit 120 within the device 104 or may be some other hardware within device 104 or another device. The apparatus may include means for receiving, as part of a vector streaming split rendering process, a bit stream expected to encode blocks of a shading atlas of each of: a first frame of the process, and a subsequent frame of the process; means for attempting to decode each of the blocks of the first frame; means for determining that the attempted decoding of a first block of the first frame was successful; means for storing the first block determined successfully decoded; means for attempting to decode each of the blocks of the subsequent frame; means for determining, subsequent to the storing, that the attempted decoding of a particular block of the subsequent frame was unsuccessful; means for identifying the stored first block as an earlier version of the particular block determined unsuccessfully decoded; and means for rendering the subsequent frame using the stored first block instead of the particular block.

The subject matter described herein can be implemented to realize one or more benefits or advantages. For instance, the described graphics processing techniques can be used by a server, a client, a GPU, a CPU, or some other processor that can perform graphics processing to implement the error concealment techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize an error concealment process that can increase the accuracy of missing block or information transferred in split rendering and/or vector streaming.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware. Various examples have been described. These and other examples are within the scope of the following claims.

What is claimed is:

1. A method of graphics processing, comprising:
   receiving, by a client device and from a server as part of a vector streaming split rendering process between the client device and the server, a bit stream encoding a sequence of shading atlases of the process, each shading atlas comprising blocks;
   decoding, by the client device, a particular shading atlas of the sequence of shading atlases;
   determining, by the client device, that a particular block of the particular shading atlas was unsuccessfully decoded;
   identifying, by the client device, a block of a prior shading atlas of the sequence of shading atlases stored on the client as a successfully decoded earlier version of the particular block; and
   rendering, by the client device, the particular shading atlas using the stored block instead of the particular block.

2. The method of claim 1, further comprising, prior to decoding the particular shading atlas:
   decoding, by the client device, the prior shading atlas;
   determining, by the client device, that a plurality of blocks, including the earlier version of the particular block in the prior shading atlas, were successfully decoded by the client device; and
   storing, by the client device, each of the plurality of blocks, including the earlier version of the particular block, determined to have been successfully decoded.

3. The method of claim 2, wherein:
   storing comprises:
      storing the prior shading atlas, and
      maintaining a block-to-shading-atlas location mapping specifying each atlas that contains the particular block; and
   identifying comprises identifying the stored block in a most recently stored shading atlas that contains the particular block.

4. The method of claim 2, wherein:
   storing comprises:
      storing the identified block apart from the prior shading atlas, and
      maintaining a block storage table specifying a block identifier of the identified block; and
   identifying comprises identifying the stored block by a block identifier of the particular block matching the block identifier of the stored block in the block storage table.

5. The method of claim 4, wherein storing comprises storing a most recent version of the identified block as corresponding to the block identifier.

6. The method of claim 2, further comprising, decoding a subsequent shading atlas of the bit stream using the stored block as part of previous state information.

7. The method of claim 2, wherein:
   the method further comprises receiving, by the client device as part of the bit stream, size and aspect ratio information for the particular block determined to be unsuccessfully decoded; and
   rendering first comprises reshaping the stored block based on the received size and aspect ratio information.

8. The method of claim 2, wherein the vector streaming split rendering process is received by the client device for an extended reality (XR) application, an augmented reality (AR) application, or a virtual reality (VR) application.

9. The method of claim 2, wherein the bit stream is received by a headset, a client multimedia console, or a head mounted display (HMD).

10. An apparatus for graphics processing, comprising:
    a memory; and
    at least one processor coupled to the memory and configured to:
       receive, by a client from a server as part of a vector streaming split rendering process between the client and the server, a bit stream encoding a sequence of shading atlases of the process, each shading atlas comprising blocks;
       decode, by the client, a particular shading atlas of the sequence of shading atlases;
       determine, by the client, that a particular block of the particular shading atlas was unsuccessfully decoded;
       identify, by the client, a stored block of a prior shading atlas of the sequence of shading atlases as a successfully decoded earlier version of the particular block; and
       render, by the client, the particular shading atlas using the stored block instead of the particular block.

11. The apparatus of claim 10, wherein the at least one processor is further configured to, prior to decoding the particular shading atlas:
    decode, by the client, the prior shading atlas;
    determine, by the client, that a plurality of blocks, including the earlier version of the particular block in the prior shading atlas, were successfully decoded; and store, by the client, each of the plurality of blocks, including the earlier version of the particular block, determined to have been successfully decoded.

12. The apparatus of claim 11, wherein:
storing comprises:
storing the prior shading atlas, and
maintaining a block-to-shading-atlas location mapping specifying each atlas that contains the particular block; and
identifying comprises identifying the stored block in a most recently stored shading atlas that contains the particular block.

13. The apparatus of claim 11, wherein:
storing comprises:
storing the identified block apart from the prior shading atlas, and
maintaining a block storage table specifying a block identifier of the identified block; and
identifying comprises identifying the stored block by a block identifier of the particular block matching the block identifier of the stored block in the block storage table.

14. The apparatus of claim 13, wherein storing comprises storing a most recent version of the identified block as corresponding to the block identifier.

15. The apparatus of claim 11, wherein the at least one processor is further configured to, decode a subsequent shading atlas of the bit stream using the stored block as part of previous state information.

16. The apparatus of claim 11, wherein:
the at least one processor is further configured to receive, by the client as part of the bit stream from the server, size and aspect ratio information for the particular block determined to be unsuccessfully decoded; and
rendering first comprises reshaping the stored block based on the received size and aspect ratio information.

17. The apparatus of claim 11, wherein the bit stream is received by a headset, a client multimedia console, or a head mounted display (HMD).

18. An apparatus for graphics processing, comprising:
means for receiving, by a client from a server as part of a vector streaming split rendering process between the client and the server, a bit stream encoding a sequence of shading atlases of the process, each shading atlas comprising blocks;
means for decoding, by the client, a particular shading atlas of the sequence of shading atlases;
means for determining, by the client, that a particular block of the particular shading atlas was unsuccessfully decoded;
means for identifying, by the client, a stored block of a prior shading atlas of the sequence of shading atlases as a successfully decoded earlier version of the particular block; and
means for rendering, by the client, the particular shading atlas using the stored block instead of the particular block.

19. The apparatus of claim 18, further comprising:
means for decoding, by the client prior to decoding the particular shading atlas, the prior shading atlas;
means for determining, by the client, that a plurality of blocks, including the earlier version of the particular block, were successfully decoded; and
means for storing, by the client, each of the plurality of blocks, including the earlier version of the particular block, determined to have been successfully decoded.

20. The apparatus of claim 19, wherein:
means for storing comprises:
means for storing the prior shading atlas, and
means for maintaining a block-to-shading-atlas location mapping specifying each atlas that contains the particular block; and
means for identifying comprises means for identifying the stored block in a most recently stored shading atlas that contains the particular block.

21. The apparatus of claim 19, wherein:
means for storing comprises:
means for storing the identified block apart from the prior shading atlas, and
means for maintaining a block storage table specifying a block identifier of the identified block; and
means for identifying comprises means for identifying the stored block by a block identifier of the particular block matching the block identifier of the stored block in the block storage table.

22. The apparatus of claim 21, wherein means for storing comprises means for storing a most recent version of the identified block as corresponding to the block identifier.

23. The apparatus of claim 19, wherein:
the apparatus further comprises means for receiving, by the client as part of the bit stream from the server, size and aspect ratio information for the particular block determined to be unsuccessfully decoded; and
means for rendering first comprises means for reshaping the stored block based on the received size and aspect ratio information.

24. A non-transitory computer-readable medium storing computer executable code for graphics processing, the code when executed by a processor causes the processor to:
receive, by a client from a server as part of a vector streaming split rendering process between the client and the server, a bit stream encoding a sequence of shading atlases of the process, each shading atlas comprising blocks;
decode, by the client, a particular shading atlas of the sequence of shading atlases;
determine, by the client, that a particular block of the particular shading atlas was unsuccessfully decoded;
identify, by the client, a stored block of a prior shading atlas of the sequence of shading atlases as a successfully decoded earlier version of the particular block; and
render, by the client, the particular shading atlas using the stored block instead of the particular block.

25. The computer-readable medium of claim 24, wherein the code when executed by the processor further causes the processor to:
decode, by the client and prior to decoding the particular shading atlas, the prior shading atlas;
determine, by the client, that a plurality of blocks, including the earlier version of the particular block in the prior shading atlas, were successfully decoded; and
store, by the client, each of the plurality of blocks, including the earlier version of the particular block, determined to have been successfully decoded.

26. The computer-readable medium of claim 25, wherein:
storing comprises:
storing the prior shading atlas, and
maintaining a block-to-shading-atlas location mapping specifying each atlas that contains the particular block; and
identifying comprises identifying the stored block in a most recently stored shading atlas that contains the particular block.

27. The computer-readable medium of claim 25, wherein:
   storing comprises:
      storing the identified block apart from the prior shading atlas, and
      maintaining a block storage table specifying a block identifier of the identified block; and
   identifying comprises identifying the stored block by a block identifier of the particular block matching the block identifier of the stored block in the block storage table.

28. The computer-readable medium of claim 27, wherein storing comprises storing a most recent version of the identified block as corresponding to the block identifier.

29. The computer-readable medium of claim 25, wherein the code when executed by the processor further causes the processor to decode a subsequent shading atlas of the bit stream using the stored block as part of previous state information.

30. The computer-readable medium of claim 25, wherein:
   the code when executed by the processor further causes the processor to receive, as part of the bit stream, size and aspect ratio information for the particular block determined to be unsuccessfully decoded; and
   rendering first comprises reshaping the stored block based on the received size and aspect ratio information.

* * * * *